US012630451B2

(12) United States Patent
Nahas

(10) Patent No.: US 12,630,451 B2
(45) Date of Patent: May 19, 2026

(54) TREATED WATER PRODUCT OBTAINED WITH USE OF A SYNTHETIC QUARTZ CRYSTAL

(71) Applicant: Richard Nahas, Ottawa (CA)

(72) Inventor: Richard Nahas, Ottawa (CA)

(73) Assignee: Richard Nahas, Ottawa (CA)

( * ) Notice: Subject to any disclaimer, the term of this patent is extended or adjusted under 35 U.S.C. 154(b) by 555 days.

(21) Appl. No.: 18/007,229

(22) PCT Filed: Jul. 29, 2021

(86) PCT No.: PCT/CA2021/051063
§ 371 (c)(1),
(2) Date: Jan. 27, 2023

(87) PCT Pub. No.: WO2022/020958
PCT Pub. Date: Feb. 3, 2022

(65) Prior Publication Data
US 2023/0278899 A1 Sep. 7, 2023

Related U.S. Application Data

(60) Provisional application No. 63/058,009, filed on Jul. 29, 2020.

(51) Int. Cl.
*C02F 1/78* (2023.01)
*C02F 1/68* (2023.01)

(52) U.S. Cl.
CPC ................. *C02F 1/78* (2013.01); *C02F 1/68* (2013.01); *C02F 2201/782* (2013.01); *C02F 2303/04* (2013.01)

(58) Field of Classification Search
None
See application file for complete search history.

(56) References Cited

U.S. PATENT DOCUMENTS

| | | |
|---|---|---|
| 4,341,636 A | 7/1982 | Harder et al. |
| 4,836,929 A | 6/1989 | Baumann et al. |

(Continued)

FOREIGN PATENT DOCUMENTS

| | | |
|---|---|---|
| AU | 2156801 | 6/2001 |
| CA | 2444385 | 10/2002 |

(Continued)

OTHER PUBLICATIONS

Lower, S. "Structure-altered water nonsense" (2015) https://www.chem1.com/CQ/clusqk.html, retrieved on Jan. 23, 2023.

(Continued)

*Primary Examiner* — Hayden Brewster
(74) *Attorney, Agent, or Firm* — Volpe Koenig

(57) ABSTRACT
A method of water treatment and a restructured water product produced thereby. Ozone is added to water. A crystal is then immersed in the ozonated water. A restructured water product is produced through the ozonated water's exposure to, and physical contact with, the crystal. At least one physical property of the restructured water product differs from a corresponding physical property of the untreated water and of the ozonated water. In some embodiments, a quartz crystal is used. In some embodiments, the quartz crystal is held within an immersion chamber and the ozonated water is passed through the chamber at a specific flow rate. The physical properties of the restructured water product remain stable for at least several months.

12 Claims, 6 Drawing Sheets

(56) References Cited

U.S. PATENT DOCUMENTS

| | | | |
|---|---|---|---|
| 5,308,507 A | 5/1994 | Robson | |
| 5,709,799 A | 1/1998 | Engelhard | |
| 5,711,950 A | 1/1998 | Lorenzen | |
| 5,741,416 A | 4/1998 | Tempest, Jr. | |
| 6,071,473 A | 6/2000 | Darwin | |
| 6,521,248 B1 | 2/2003 | Holloway et al. | |
| 6,767,458 B2 | 7/2004 | Safta | |
| 7,261,822 B2 | 8/2007 | Kitada | |
| 7,294,270 B2 | 11/2007 | Miyazaki et al. | |
| 7,300,569 B2 | 11/2007 | Petty | |
| 7,361,255 B1 | 4/2008 | Kuhry | |
| 7,632,410 B2 | 12/2009 | Heiss | |
| 8,088,289 B2 | 1/2012 | Tribelsky et al. | |
| 9,585,979 B2 | 3/2017 | Long | |
| 2006/0275488 A1 | 12/2006 | Bagley | |
| 2009/0077992 A1 | 3/2009 | Anderson et al. | |
| 2009/0162271 A1 | 6/2009 | Holloway, Jr. et al. | |
| 2012/0145649 A1 | 6/2012 | Tribelsky | |
| 2012/0192487 A1 | 8/2012 | Tanaka et al. | |
| 2016/0221852 A1 | 8/2016 | Johnson | |
| 2017/0113954 A1 | 4/2017 | Stoppelbein | |
| 2021/0205486 A1* | 7/2021 | Cho | A61L 2/183 |

FOREIGN PATENT DOCUMENTS

| | | |
|---|---|---|
| CA | 2411375 | 5/2004 |
| CA | 2411375 A1 | 5/2004 |
| CA | 2619999 A1 | 2/2007 |
| CA | 2639872 | 7/2007 |
| CA | 2638633 | 11/2007 |
| CA | 2691264 | 8/2008 |
| CA | 2783839 | 12/2010 |
| CA | 2803926 | 10/2012 |
| CN | 2410290 | 12/2000 |
| CN | 2410291 | 12/2000 |
| CN | 202643477 | 1/2013 |
| CN | 203700075 | 7/2014 |
| CN | 105585180 | 5/2016 |
| DE | 4202809 | 8/1993 |
| DE | 20218674 U1 | 4/2004 |
| FR | 2965805 | 4/2012 |
| GB | 2496092 | 5/2013 |
| WO | 02074693 | 9/2002 |
| WO | 2004084807 | 10/2004 |
| WO | 2009021277 | 2/2009 |
| WO | 2009049120 | 4/2009 |
| WO | 2010142655 | 12/2010 |

OTHER PUBLICATIONS

Liu X, Lu WC, Wang CA, Ho KM. Energetic and fragmentation stability of water clusters (H2O)n, n = 2-30. Chem Phys Lett. 2011;508(4-6):270-5. doi: 10.1016/j.cplett.2011.04.055. Published Apr. 19, 2011. 6 pages.

* cited by examiner

TREATED WATER PRODUCT OBTAINED WITH USE OF A SYNTHETIC QUARTZ CRYSTAL

CROSS REFERENCE TO RELATED APPLICATIONS

This application is a 35 USC 371 national stage filing of PCT Application No. PCT/CA2021/051063, which was filed on Jul. 29, 2021, is entitled "METHOD OF WATER TREATMENT AND TREATED WATER PRODUCED THEREBY," and claims priority to U.S. Provisional Application No. 63/058,009, filed on Jul. 29, 2020, each of which is incorporated by reference herein in their entireties.

TECHNICAL FIELD

The present invention relates to the field of water purification treatment. More specifically, it relates to treating water so that physical properties of the water are altered and remain stable over time.

BACKGROUND

Sources of water for human consumption often contain pollutants and contaminants. Additionally, the taste or other sensory qualities of naturally occurring water may be unpleasant. Thus, there is great interest in developing water treatment systems to purify water and render water safe for human consumption, as well as to alter sensory qualities.

Various additives have conventionally been used in water treatment processes to reduce contaminants in water. Chlorine, in particular, is often used on a wide scale. However, chlorine reacts with humic acid found in water to form trihalomethane, a carcinogen. As a result, alternatives to chlorine, including ozone, have become popular, especially with respect to water intended for drinking.

Further, various methods of altering physical properties of conventional, naturally occurring water have also been explored. For instance, methods that alter the pH or the surface tension of naturally occurring water may provide advantages in manufacturing, storage, and/or consumption, for instance by increasing the shelf life and/or improving the taste. Some such methods take advantage of the physical and chemical properties of water, including the electromagnetic bonds within and between water molecules. In particular, some methods have explored the electromagnetic properties of quartz crystals in creating water clusters within water, which can impart specific physical properties.

However, while some researchers have studied the significance of ozone-water complexes and water clusters in the ozone layer of the upper atmosphere, the potential interactions with respect to drinking water treatment and/or bottling have not been investigated. Further, in an effort to alter the physical properties of water molecules, some have proposed the use of water processing methods that include chemical or alkalizing treatment, water softening treatments, subjection of the water to strong and weak electrical and magnetic fields, LED and laser light, and a variety of other processes. The prior processes have not been able to demonstrate that the apparent changes induced in the water are persistent over a period of time, because the prior methods generate restructured water for consumption or use immediately after the water is produced.

Thus, there is a need for treated and/or purified water products that demonstrate stability over time, and for water treatment methods that provide safety and sensory benefits but may be used with conventional bottling and water storage practices.

SUMMARY

This document discloses a method of water treatment and a restructured water product produced thereby. Ozone is added to water. A crystal is then immersed in the ozonated water. A restructured water product is produced through the ozonated water's exposure to, and physical contact with, the crystal. At least one physical property of the restructured water product differs from a corresponding physical property of the untreated water and of the ozonated water. In some embodiments, a quartz crystal is used. In some embodiments, the quartz crystal is held within an immersion chamber and the ozonated water is passed through the chamber at a specific flow rate. The physical properties of the restructured water product remain stable for at least several months.

In a first aspect, this document discloses a method for treating water, the method comprising the steps of: adding ozone to the water to thereby produce ozonated water; and immersing a crystal in the ozonated water.

In a second aspect, this document discloses a water product having at least one physical property that differs from at least one specific property of at least one of untreated water, the water product produced by a method comprising the steps of: adding ozone to the water to thereby produce ozonated water; and immersing a crystal in the ozonated water.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1A:
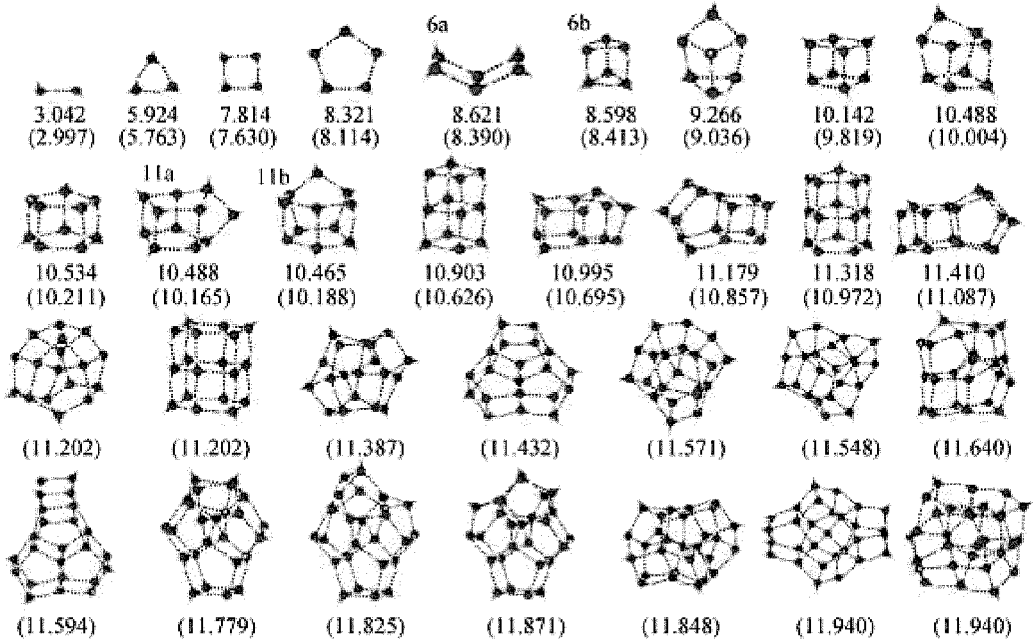
FIG. 1A is a schematic of various three-dimensional water clusters, according to the prior art.

The present invention relates to a method for water treatment and a restructured water product produced by that method. The restructured water product is suitable for human consumption. The restructured water product has at least one physical property that is different from a property of untreated water. The water product may be bottled or stored using conventional bottling and/or storage systems.

The method of water treatment of the present invention comprises two stages. First, water is treated with ozone, to produce ozonated water. A crystal is then immersed in the ozonated water. Electrochemical interactions between the ozonated water and the crystal, including the formation of water clusters as will be described below, result in a restructured water product having specific physical properties not found in the ozonated water or in the original, untreated water. These properties remain stable for longer periods of time than previously found, allowing the restructured water product to be bottled and/or stored using conventional commercial methods and practices, among others.

As would be understood by the person skilled in the art, ozone can be added to water by any suitable mechanism. In one embodiment, the ozone is added to the water through the use of an ozone generator. The ozone dissolves in the water, forming ozone-water complexes. The concentration of the ozone in the water is in a range of 0.3 ppm to 0.4 ppm. However, depending on the embodiment of the present invention, concentrations of ozone between 0.2 ppm and 0.5 ppm may be effective.

Next, a crystal is immersed in the ozonated water (i.e., the ozonated water is exposed to, and comes into physical contact with, the surface of a crystal). In a preferred embodiment, this step is performed by passing the ozonated water through an immersion chamber containing the crystal. A specific flow rate is chosen for passing the ozonated water through the immersion chamber, to optimize the transfer of energy between the ozonated water and the piezoelectric crystal.

The crystal can be any kind of crystal that produces piezoelectricity or pyroelectricity. Some examples of such crystals are, without limitation, tourmaline crystal, londonite crystal, and quartz crystal. In embodiments in which a quartz crystal is used, the quartz crystal can be a natural quartz crystal or a synthetic quartz crystal can be used. Additionally, a quartz crystal that is a hybrid of natural and synthetic quartz may be used, depending on the embodiment. Natural quartz crystal may provide desirable advantages over synthetic or hybrid quartz, for certain applications. However, the desired form of crystal may depend on the implementation of the invention and may vary.

When an immersion chamber is used, the ozonated water is circulated between the immersion chamber and a reservoir of ozonated water. This continued inflow and outflow of ozonated water through the immersion chamber allows for constant mixing between ozonated water that has already been exposed to the crystal and ozonated water that has not yet been exposed to the crystal. Additionally, the continued motion of the ozonated water increases the exposure of the ozonated water to the crystal.

The physical properties of the restructured water product remain stable over time. Specifically, the physical properties of the restructured water that produce taste advantages and/or other sensory advantages can remain stable for 24 months or more. Various experiments have shown stability after several weeks, three months, four months, and 24 months.

There are specific electrochemical properties of water, ozone, and crystals (especially quartz crystals, $SiO_4$) that, when interacting according to the method of the invention, can cause changes in the physical properties of water, resulting in restructured water. These electrochemical properties will be discussed below.

Water Structure and Vibration

As is well-known, water is composed of individual $H_2O$ molecules having a three-dimensional structure. Each water molecule also has an electromagnetic field, composed of the electromagnetic fields of the atoms comprising the water molecule. Nuclear magnetic resonance spectroscopy is frequently used to detect the electromagnetic fields of the atoms in water molecules through the instrument's ability to stimulate, and measure the vibrations of water molecules. The vibrations produced by any molecule are a function of the energy of the molecules constituent atoms, and the bonds that hold the molecules together. The waveform created by any molecule represents the sum of the oscillations resulting from that molecule's individual bond energies. Each molecule thus produces a vibrational signature through resonant waves, which reflects the molecule's structure and shape.

Resonance, in this context, is a basic and well-studied principle of the physics of waves, and refers to the amplification of vibrations through positive interference. Resonance is also relevant to the science of crystals, as will be discussed more below. A crystal is any material whose constituent atoms or molecules are arranged in a symmetrical, ordered, three-dimensional repeating array. Molecules that are arranged in a crystalline structure vibrate in resonance.

Figure 1B:
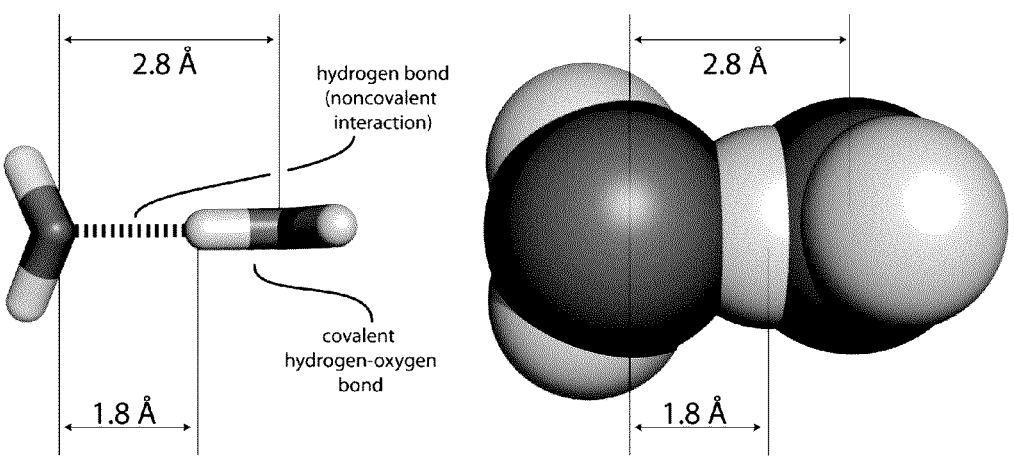
FIG. 1B illustrates bonds between water molecules, according to the prior art.

Water clusters in water occur due to the bonds that form between water molecules (see FIG. 1A, from Liu et al, "Energetic and Fragmentation stability of water clusters (H2O)n, n=2-30", Chem Phys Lett 2011; 508:270-275, the entirety of which is hereby incorporated herein by reference). Specifically, polar covalent bonds form between the oxygen and hydrogen atoms of each water molecule. The polarity of the water molecule attracts surrounding water molecules through evenly distributed hydrogen bonds (FIG. 1B). The attraction between the surrounding water molecules also results in van der Waals interactions, which contribute to the three-dimensional structure of the water molecules and the strong dipole of the water molecules that hold these clusters together.

Although water molecules may rapidly form into water clusters, the water cluster shapes, once formed, are generally stable over time. The longevity of water cluster stability suggests that a water cluster is held together by the electromagnetic field surrounding the cluster, which may serve as a 'template' or pattern for additional individual molecules to join. This so-called cluster template preserves the shape of the water cluster, and thus preserves any properties of the resulting clustered water.

Indirect assessment of water cluster structure has been attempted using a variety of analytical techniques, including infrared spectroscopy, Raman spectroscopy, molecular dynamic simulations, X-ray spectroscopy, and mass spectroscopy. While these tools have revealed certain properties of water clusters, their actual structure remains challenging to measure directly.

Ozone and Water Structure

As is also well-known, ozone is a gaseous material that is created from oxygen and is composed of three oxygen atoms. Generally, ozone is produced by an electrical arc discharged through air, which prompts two oxygen atoms to combine with a free oxygen radical. Such formations of ozone are highly unstable and reactive. The direct reactivity of ozone is based on the strong reduction potential of the ozone molecule, which makes it act as a 1,3 dipole, a nucleophilic agent, and an electrophilic agent in chemical reactions. This reactivity of ozone with microorganisms, contaminants, and other dissolved solids allows ozone to be used as an effective disinfectant.

Drinking water supplies are commonly disinfected with ozone, to improve the purity and safety of the water. The addition of ozone to water not only kills bacteria, but also inactivates many viruses, cysts, and spores. Ozone also oxidizes organic chemical compounds in the water, and as a result renders them harmless to the environment. In addition to ozone's role as a disinfectant, ozone can also be used as a decolorizer, deodorizer, detoxifier, precipitant, coagulant, and for removing unpleasant tastes.

Regulatory agencies have established criteria for water ozonation. Specifically, there are established concentration and time values, intended to ensure required disinfection rates. In particular, these guidelines establish minimum thresholds to inactivate *Giardia, Cryptosporidium*, and most viruses. As should be clear, inadequate ozonation can pose a risk to human and environmental health. However, excessive doses of ozone waste energy and increase costs, and can also lead to increased levels of bromate, a potential carcinogen, in some cases. Thus, a widely recommended target ozone concentration is 0.3 to 0.4 parts per million, equivalent to 0.3 to 0.4 milligrams per litre or mg/L.

Referring back to FIGS. 1A and 1B, although there is little certainty as to the precise mechanics of ozone-water interaction, it is presumed that ozone molecules are unable to disrupt the hydrogen bonds between water molecules within the water clusters. The ozone molecules remain near the surface of a water cluster and bond with one or two neighboring water molecules in the network. Theoretical calculations of ozone interactions with water clusters suggest that the greatest bond energy values were found in hexagonal water clusters.

Ozone decays by reacting with one of its constituents or by degrading to oxygen. This depends on ozone's temperature, pH, and the specific solutes that ozonated water contains. The half-life of ozone in water of pH 7.0 at 20° C. is approximately twenty-four minutes. As such, in most typical cases, the ozone used for water treatment has completely disappeared by the time the treated water reaches the end user. The concentration of ozone in water is routinely measured during water treatment. While precise measurements can be made under laboratory conditions using commercial ultraviolet meters, field testing is typically done using a standard indigo trisulfonate colorimetric technique. The wavelength produced by this method can be measured with a simple spectrophotometer, used to compare water samples produced using different ozone concentrations.

Piezoelectric Effect of Quartz Crystal and Water

Quartz, which is crystallized $SiO_4$, is a piezoelectric substance. That is, electric charge accumulates in solid quartz as a response to applied mechanical forces. Piezoelectricity may occur due to the crystal lattice structure of quartz, which allows for redistribution of electrons throughout its entire structure thereby producing an electric field.

Molecular dynamics (MD) simulations are used to predict molecular structure based on the interference of intramolecular and intermolecular forces. MD simulation studies have been widely used to create models of water structure under various conditions. Various MD simulations demonstrate that, through its piezoelectric effects, quartz crystals promote the formation of water clusters. Other types of crystals that produce similar piezoelectric effects may be used in a similar fashion.

Figure 2:
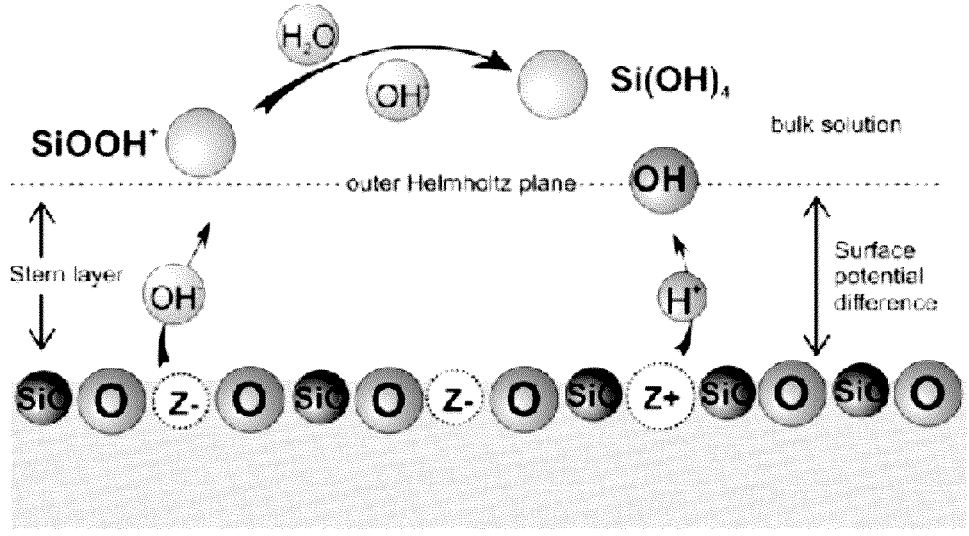
FIG. 2 is a process diagram showing the dissolution of anions and cations from the surface of quartz, according to the prior art.
Figure 3A:
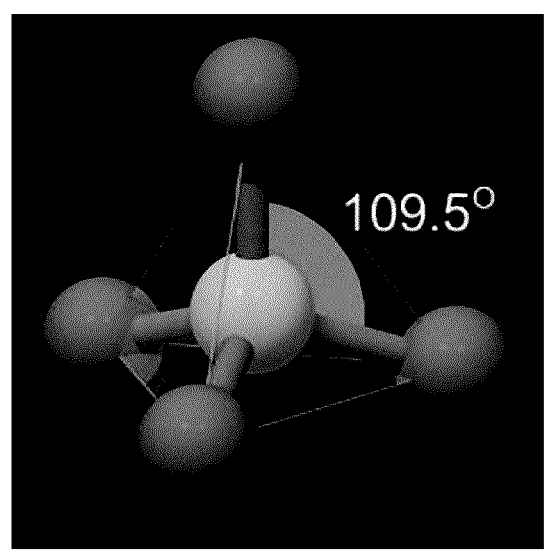
FIG. 3A is a schematic of the tetrahedral structure of quartz crystal, according to the prior art.
Figure 3B:
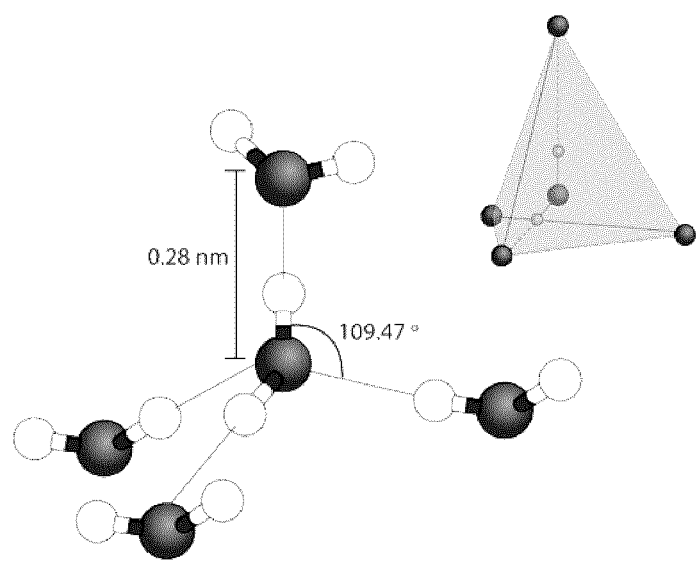
FIG. 3B is a schematic of the tetrahedral structure of water, according to the prior art.

A further advantage of embodiments of the invention that use quartz crystals is that quartz is soluble in water, in some circumstances. That is, solid silicon dioxide and water combine to produce an aqueous silicic acid ($H_4SiO_4$), which remains safe for human consumption. The exact mechanism of dissolution remains unknown; however, the theory that best fits the observed data in the prior art is that silicon and oxygen atoms are removed from the quartz surface (as illustrated in FIG. 2). Such a process may be facilitated by the similarities between $SiO_4$ and water. Specifically, the tetrahedral structure of $SiO_4$ (quartz crystal, shown in FIG. 3A) and the tetrahedral structure of hydrogen-bonded water molecules (shown in FIG. 3B) are extremely similar. In particular, both structures include near-identical bond angles, and both form hexagonal crystals. Thus, in embodiments of the invention that use a quartz crystal, some of the $SiO_4$ from the crystal dissolves into the ozonated water while the ozonated water and the quartz crystal interact in the immersion chamber.

The restructured water product also contains water clusters. These water clusters are produced by harnessing the reactive potential of transient ozone in water to create strong, highly structured water using a cluster template provided by contact with a piezoelectric crystal. That is, the piezoelectric effect of the crystal, interacting with highly reactive ozone, causes the water to cluster in certain shapes which form a so-called template. Additional water molecules may join the clusters following that template. When a quartz crystal is used, the similar tetrahedral structure of $SiO_4$ and water molecules likely leads both to form hexagonal crystals (i.e., the template is hexagonal).

Figure 4:
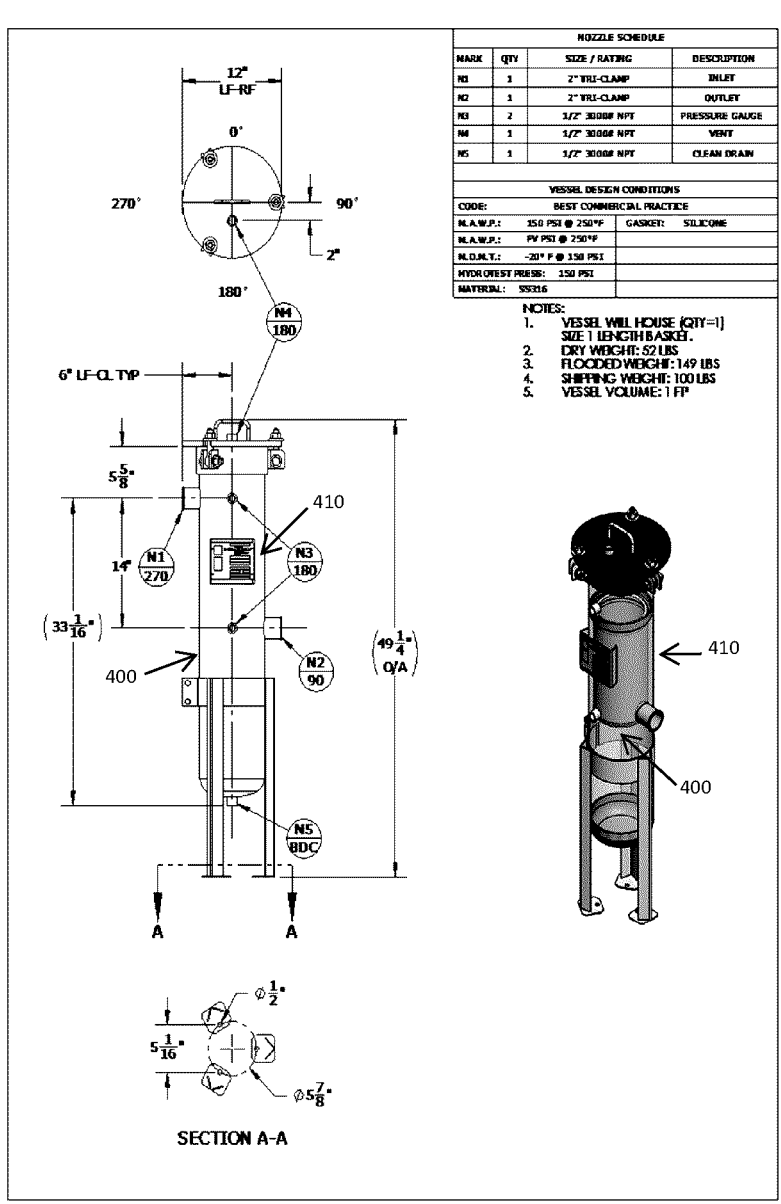
FIG. 4 is a schematic diagram of an immersion chamber.

FIG. 4 is a diagram of an immersion chamber 400 which can, in some embodiments of the invention, be used to immerse the crystal in the ozonated water. The ozonated water to be treated is contained in a reservoir outside of the immersion chamber 400 and brought thereinto through an inlet conduit (N1). After being exposed to the crystal within the immersion chamber 400, the resulting water product is discharged from the immersion chamber 400 through an outlet conduit (N2). In a preferred embodiment, the inlet conduit (N1) and the outlet conduit (N2) are centrally positioned along the exterior perimeter of the central chamber 410 of the immersion chamber 400 to facilitate constant immersion of the crystal within a porous container (not shown). In this particular embodiment, the inlet conduit (N1) is in a relative position above the porous container within the central chamber, and the outlet conduit (N2) is in a relative position below the porous contained within the central chamber 410. The flow of water through the inlet conduit (N1) and the outlet conduit (N2) allows for constant physical contact between the ozone water and the quartz crystal. Note that this exact immersion chamber configuration is not required by the present invention. In accordance with the present invention, various chamber configurations may be readily contemplated by a person of skill in the art. Rather, the present invention merely requires that the crystal be substantially immersed in the ozonated water during this process. That is, there may be many methods of immersing a crystal in ozonated water and circulating the ozonated water around the crystal that are known to the person skilled in the art. As should be clear, any such suitable techniques may be employed and should be considered as coming within the scope of this invention.

Figure 5:
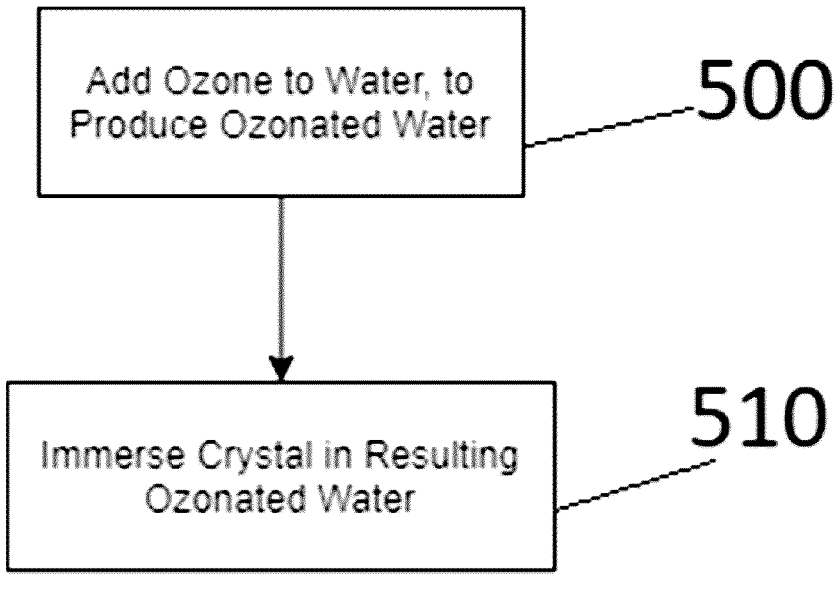
FIG. 5 is a flowchart detailing a method for the treatment of the water, according to an aspect of the invention.

FIG. 5 is a flowchart detailing method for treating water, according to an aspect of the present invention. First, at step 500, ozone is added to water. The resulting ozonated water is exposed to a crystal at step 510, to thereby produce a water product. As discussed above, a restructured water product having at least one altered physical property can be produced by such a method.

Experimental Results

In experimental settings, various properties of water were examined to illustrate the present invention. In particular, various properties of water in various stages of treatment were examined. That is, the tests examined the properties of tap water, distilled and/or double distilled water, and bottled spring water that was provided by Lanark Pure Country Springs Inc., as well as bottled spring from that same source, bottled on the same day, that was then treated using the method presented herein. It should of course be clear that various factors may alter the properties of the present invention's water product, such as the length of time for which the ozonated water is allowed to circulate into and out of the immersion chamber. Accordingly, nothing in these experimental results should be considered to limit the scope of the present invention in any way.

A first test examined the conductivity of restructured water products, produced in accordance with the present invention, at various times after the water products were bottled. Multiple water products with different concentrations of ozone were examined. Samples were stored at 4° C. and at 24° C. It should be noted that the concentration of ozone in the ozonated (but not restructured) spring water was 0.4 mg/L. The conductivity of water samples was measured using a COM-100 TDS meter (HM Digital, Inc., Los Angeles, CA). A 100 ml beaker was primed by rinsing the beaker three times with the water sample being evaluated, and then filled with 50 mL of the sample water. The probe was rinsed with 5 mL aliquots of distilled water three times and subsequently with 5 mL of the water sample being tested before the conductivity reading. The conductivity probe was submerged in the water sample and held steady for one minute without coming into contact with the beaker. A stable conductivity reading was then recorded. Three separate measurements of each sample were taken. The conductivity values are shown in Table 1 below, with the results expressed as mean±SEM.

TABLE 1A

| | | Conductivity. Water Type | | |
| | | | | |
| Source water | Ozonated spring water | Restructured Spring Water (ozone concentration 0.1 mg/L) | Restructured Spring Water (ozone concentration 0.4 mg/L) | Restructured Spring Water (ozone concentration 0.77 mg/L) |
|---|---|---|---|---|
| 296.7 ± 0.9 | 299.3 ± 0.3 | 298.7 ± 0.3 | 296.3 ± 3.0 | 302.3 ± 0.9 |

Another test examined the pH of source water, ozonated water and restructured water at three different ozonation concentrations. The pH of each water sample was measured using a HiKiNS pH meter. The pH probe was calibrated with calibration solutions 7.00 and 9.00 prior to measurement of each sample. A 100 mL beaker was primed by rinsing the beaker three times with the water sample being evaluated, and then filled with 50 mL of the sample water. The electrode portion of the meter was rinsed with 5 mL aliquots of distilled water 3 times and then again with 5 mL of the water sample being tested before each pH reading. The pH probe was submerged in the water sample and held steady for one minute without coming into contact with the beaker. A stable pH reading was then recorded. Three separate measurements of each sample were taken. pH values are shown in Table 2 below, with the results expressed as mean±SEM. As can be seen, the addition of ozone increased the pH of the spring water, including for the ozonated spring water that was restructured. The increase in pH caused by ozonation was found to be statistically significant (p=<0.001 to 0.022, Student's paired t-test).

TABLE 2A

| | | pH. Water Type | | |
| | | | | |
| Source water (spring water) | Ozonated spring water | Restructured Spring Water (ozone concentration 0.1 mg/L) | Restructured Spring Water (ozone concentration 0.4 mg/L) | Restructured Spring Water (ozone concentration 0.77 mg/L) |
|---|---|---|---|---|
| 7.67 ± 0.01 | 7.98 ± 0.01 | 7.89 ± 0.03 | 8.17 ± 0.01 | 7.89 ± 0.01 |

Similar pH tests were performed at various times after the restructured water products were bottled, as shown in Table 2B. Additionally, samples were stored at different temperatures (specifically 4° C. and 24° C.), to observe effects of temperature. The results are shown as mean±SEM.

Figure 6:
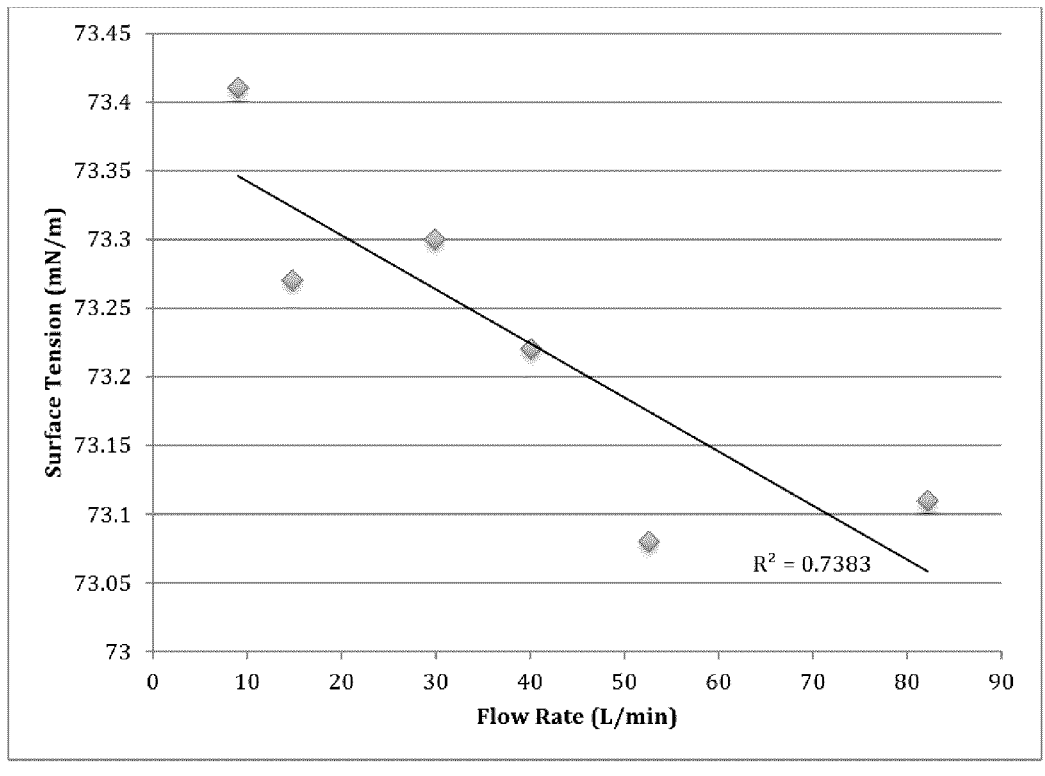
FIG. 6 is a chart showing surface tension in various samples of restructured water products according to another aspect of the invention.

Another test examined the surface tension of restructured water products several months after bottling, as a function of the initial flow rate with which the water was passed through an immersion chamber according to the present invention. Specifically, four months after restructured water products were bottled, the surface tension was evaluated. The surface tension values in this experiment were measured using a Krüss bubble pressure tensiometer (BPT), with a data smoothing setting set to strong. The BPT was calibrated, using deionized water, to a value of 72.0 mN/m. A sample volume of 20 mL was poured directly into a sample vessel. The vessel was placed on the BPT and a 10 μL pipette tip was lowered into the water in the sample vessel to half its depth. The BPT was configured to follow a dynamic measuring method, which took a series of measurements at progressively increasing surface ages from 10 ms to 30,000 ms, with each surface age measurement repeated in triplicate, and with the mean value presented as the output value. There was a 1000 ms pause after each measurement. The BPT purged any remaining liquid from the pipette tip after each series of measurements. The surface tension values resulting are shown in FIG. 6. As can be seen, higher flow rates resulted in lower surface tensions, several months after the restructuring treatment was performed.

In another set of tests, spring water (SW), ozonated spring water (OSW), and restructured spring water produced according to the present invention (RSW) were compared in terms of specific gravity, total dissolved solids (TDS) and stable isotope ratios, all of which are well-known measurements in the art. Experimental values are presented in Tables 3A (specific gravity), 3B (TDS in ppm), and 3C (stable isotope of $^2$H and $^{18}$O in ‰). Except for the stable isotope values, all results are expressed as mean±SEM. No statistically significant difference was found in the specific gravity or $^{18}$O stable isotope ratio. However, restructured spring water was found to have lower TDS than spring water and ozonated spring water (p<0.001, Student's paired t-test). Additionally, restructured water was found to have lighter δ $^2$H values than both spring water and ozonated water (p<0.001, Student's paired t-test).

TABLE 7E

| | Specific Gravity. Water Type | | |
| --- | --- | --- | --- |
| Spring Water (SW) | Ozonated Water (OSW) | Restructured Spring Water (RSW) |
| 1.002 ± 0.00 | 1.000 ± 0.000 | 0.999 ± 0.000 |

TABLE 7G

| | TDS in ppm. Water Type | | |
| --- | --- | --- | --- |
| Spring Water (SW) | Ozonated Water (OSW) | Restructured Spring Water (RSW) |
| 205.67 ± 0.58 | 206 ± 0.00 | 189.67 ± 0.58 |

TABLE 7I

| | Stable Isotope Ratios (% o). | | |
| --- | --- | --- | --- |
| | | Water Type | |
| Isotope | Spring Water (SW) | Ozonated Water (OSW) | Restructured Spring Water (RSW) |
| $\delta\ ^2H$ | −79.72 | −80.37 | −80.52 |
| $\delta\ ^{18}O$ | −11.86 | −12.00 | −11.90 |

The data presented in the various tables above and in FIG. 6 indicate that, at least in the tested implementation of the invention, the effects of the restructuring process on the pH and surface tension of water were most pronounced. However, again, it should be understood that the experimental results presented herein are not intended to limit the invention in any way. In particular, although pH and surface tension have been seen to change as a result of restructuring and/or adding restructured water to other water samples, it should be understood that other properties not tested in these experiments may also be altered. The person skilled in the art will conceive of many different properties that may be altered via restructuring, any of which should be considered to fall within the scope of the invention.

Further, the specific experimental methodologies and techniques used should not be taken as limiting the invention. Additionally, those skilled in the art would appreciate that the water treatment method disclosed herein can be used in a number of different ways for use with many water treatment systems. Furthermore, such a method may be integrated into pre-existing methods for water treatment, and/or form a component part of a larger method.

A person understanding this invention may now conceive of alternative structures and embodiments or variations of the above, all of which are intended to fall within the scope of the invention as defined in the claims that follow.

I claim:

1. A water product having at least one physical property that differs from at least one specific property of untreated water, wherein the water product is produced by a method comprising the steps of:

adding ozone to water to thereby produce ozonated water; and using an immersion chamber, immersing a crystal in the ozonated water, wherein the crystal comprises a synthetic quartz crystal that is at least one of: piezo-electric and pyroelectric, and wherein the immersing facilitates a transfer of electrical energy between said ozonated water and said crystal, wherein the ozonated water is introduced to the immersion chamber, the immersion chamber containing the crystal, and wherein the ozonated water flows past the crystal inside the immersion chamber such that the ozonated water contacts the crystal as said ozonated water flows through the immersion chamber and such that the transfer of electrical energy occurs, wherein an inlet of the immersion chamber is elevated with respect to an outlet of the immersion chamber, such that a flow of the ozonated water within the immersion chamber is at least partially determined by gravity, and wherein the at least one physical property of the water product is conductivity and the at least one specific property of the untreated water is also conductivity, and wherein a conductivity of the water product is different from a conductivity of the untreated water.

2. The water product of claim 1, wherein the ozonated water flows through the immersion chamber at a specific flow rate.

3. The water product of claim 1, wherein the at least one physical property remains stable for a period of time.

4. The water product of claim 3, wherein the period of time is twenty-four months.

5. The water product of claim 1, wherein ozone is added to the water using an ozone generator.

6. The water product of claim 1, wherein ozone is added to the water through dissolution.

7. The water product of claim 1, wherein the concentration of ozone in the ozonated water is in a range of 0.2 ppm to 0.5 ppm.

8. The water product of claim 1, wherein an inert mesh basket holds the crystal within the immersion chamber.

9. The water product of claim 1, wherein ozonated water that has been exposed to the crystal mixes with ozonated water that has not yet been exposed to the crystal.

10. The water product of claim 9, wherein at least one additional physical property of the ozonated water is altered by exposure to the crystal, such that the at least one physical property of the ozonated water differs from a corresponding at least one property of the water product, said at least one additional physical property of the ozonated water being a property other than conductivity.

11. The water product of claim 9, wherein water clusters in the ozonated water are altered by exposure to the crystal.

12. The water product of claim 11, wherein at least one of a size of the water clusters and a shape of the water clusters is altered.

* * * * *